UNITED STATES PATENT OFFICE.

GUSTAVE JOHN LEMMENS, OF WATERINGBURY, AND PERCIVAL JOHN FRYER, OF TUNBRIDGE, ENGLAND.

INSECTICIDE, SHEEP-DIP, ANIMAL-WASH, AND THE LIKE.

1,242,955.  Specification of Letters Patent.  Patented Oct. 16, 1917.

No Drawing.  Application filed January 16, 1917. Serial No. 142,739.

*To all whom it may concern:*

Be it known that we, GUSTAVE JOHN LEMMENS and PERCIVAL JOHN FRYER, both subjects of the King of Great Britain and Ireland, residing, respectively, at Wateringbury, Kent, England, and Tunbridge, Kent, England, have invented new and useful Improvements Relating to Insecticides, Sheep-Dips, Animal-Washes, and the like, of which the following is a specification.

This invention has for one of its objects to provide improved means for the destruction of insects, vermin, and the like parasites of various animals, and plants, such means being capable of production and use in the form of preparations as a powder, paste or liquid, suitable for ready use as an insecticide powder or wash for spraying upon plants, trees and other vegetable growth, and upon soil, and as a sheep dip, cattle dressing, or wash for animals, whereby the parasitic pest is destroyed without any injury whatsoever to the plant or animal life.

The invention comprises a method or means for producing an organic salt or compound or organic salts or compounds (hereinafter termed compound) obtained from the seeds, leaves (and other portions of the plant) of the species and varieties of the genus of plants known as *Tephrosia* of the natural order *Leguminosæ* and the suborder *Papilionaceæ* also called igongo and other local titles.

The said compound is obtained by extraction or other suitable method. In the manufacture of sheep dip such compound is mixed with soap, sulfur or other ingredients and made into a paste, powder or liquid in any known manner. Likewise, in the manufacture of an insecticide for use for the destruction of plant pests, the compound aforesaid may be mixed with soap, sulfur or other substances which serve as emulsifying or carrying agents and diluents.

The aforesaid compound may be used with various other carrying agents, diluents or other substances to form preparations for the destruction of earth worms, grubs and the like. As a wash, the mixture may contain from about one half to one ounce of the extract emulsified with about four ounces of soft or hard soap and water, the whole being made up to 20 ounces by the addition of alcohol and water or water alone. The invention is not, however, limited to these materials or proportions.

The *Tephrosia* material is preferably acted upon by a suitable solvent such as benzin which removes the compound from the seeds, leaves and other portions of the plants.

During the manufacture of the dip, wash or insecticide, a suitable water softening reagent or reagents which will serve to soften the water with which the dip or the like may be mixed for use, may be added to the composition. In like manner a suitable antiseptic or bactericide and also a coloring matter may be added.

The dip, wash, or the like may contain any desired proportion of the compound according to the class of service to which it is to be put. Or it may be let down or diluted before use. In practice, the mixture employed will contain from one and a half ounces of the compound to 100 gallons of water for the destruction of small and delicate insects up to 12 ounces of the compound to 100 gallons of water for the destruction of the more hardy and vigorous varieties.

The new or improved material has many important advantages over materials heretofore employed. For example, in the manufacture of insecticides for use upon plants, such substances as nicotin, arsenate of lead and Paris green, are usually employed. Some of these materials are poisonous to man and animals and are liable to damage plants. But the new or improved material is practically innocuous to man and large animals and cannot cause injury to plants. Likewise, in the manufacture of sheep dip, and animal washes arsenical preparations and mixtures containing carbolic acid are used. Such materials are poisonous both to man and animals and are liable to cause injury to the skin. The new or improved material has no observed effect upon the skin while very effective for destroying insects, is, as before stated, innocuous to man and large animals.

What we claim is:—

1. A new antiparasitic compound comprising a benzin extractive from desiccated parts of the plants known as *Tephrosia* mixed with an emulsifying agent.

2. A new antiparasitic compound comprising a benzin extractive from desiccated parts of the plants known as *Tephrosia* mixed with an emulsifying agent containing sulfur.

3. A new antiparasitic compound comprising a liquid soap vehicle to which has been added a benzin extractive of *Tephrosia*.

4. A new antiparasitic compound comprising a liquid soap vehicle containing sulfur to which has been added a benzin extractive of *Tephrosia*.

5. A new antiparasitic compound comprising substantially one half to one part (weight) of *Tephrosia* extractive by benzin, four parts of soap and fifteen parts of diluted alcohol.

Dated this 13th day of December, 1916.

GUSTAVE JOHN LEMMENS.
PERCIVAL JOHN FRYER.